June 4, 1940.   L. L. CUNNINGHAM   2,203,523
PRESSURE CONTROLLER
Filed July 15, 1935   2 Sheets-Sheet 2

Inventor
Lewis L. Cunningham
By George H. Fisher
Attorney

Patented June 4, 1940

2,203,523

UNITED STATES PATENT OFFICE 2,203,523

PRESSURE CONTROLLER

Lewis L. Cunningham, Minneapolis, Minn., assignor to Minneapolis-Honeywell Regulator Company, Minneapolis, Minn., a corporation of Delaware Application July 15, 1935, Serial No. 31,463

7 Claims. (Cl. 201—48)

This invention relates to pressure controllers in general and more specifically to that type of controller utilizing an inverted pressure operated bell.

An object of this invention is to provide a pressure controller of the type described of novel construction and mode of operation whereby extremely accurate control may be obtained.

Another object of this invention is to provide a pressure controller of the type described for operating a current controlling mechanism wherein the pressure required to operate the mechanism may be adjusted and wherein the range or differential of pressures required to completely operate the current controlling mechanism may be varied.

Another object of this invention is to provide a pressure controller of the type described wherein a mechanism is operated by normal changes in pressure and wherein another mechanism is operated by abnormal changes in pressure.

Another object of this invention is to provide a novel adjusting means for a pressure controller of the type described.

Still another object of this invention is to provide a novel sealing means for a pressure chamber whereby the pressure chamber is effectively sealed and whereby the friction produced by sealing the same is reduced to a minimum.

Other objects and advantages will become apparent to those skilled in the art upon reference to the accompanying specification, claims and drawings, in which drawings:

Figure 1:
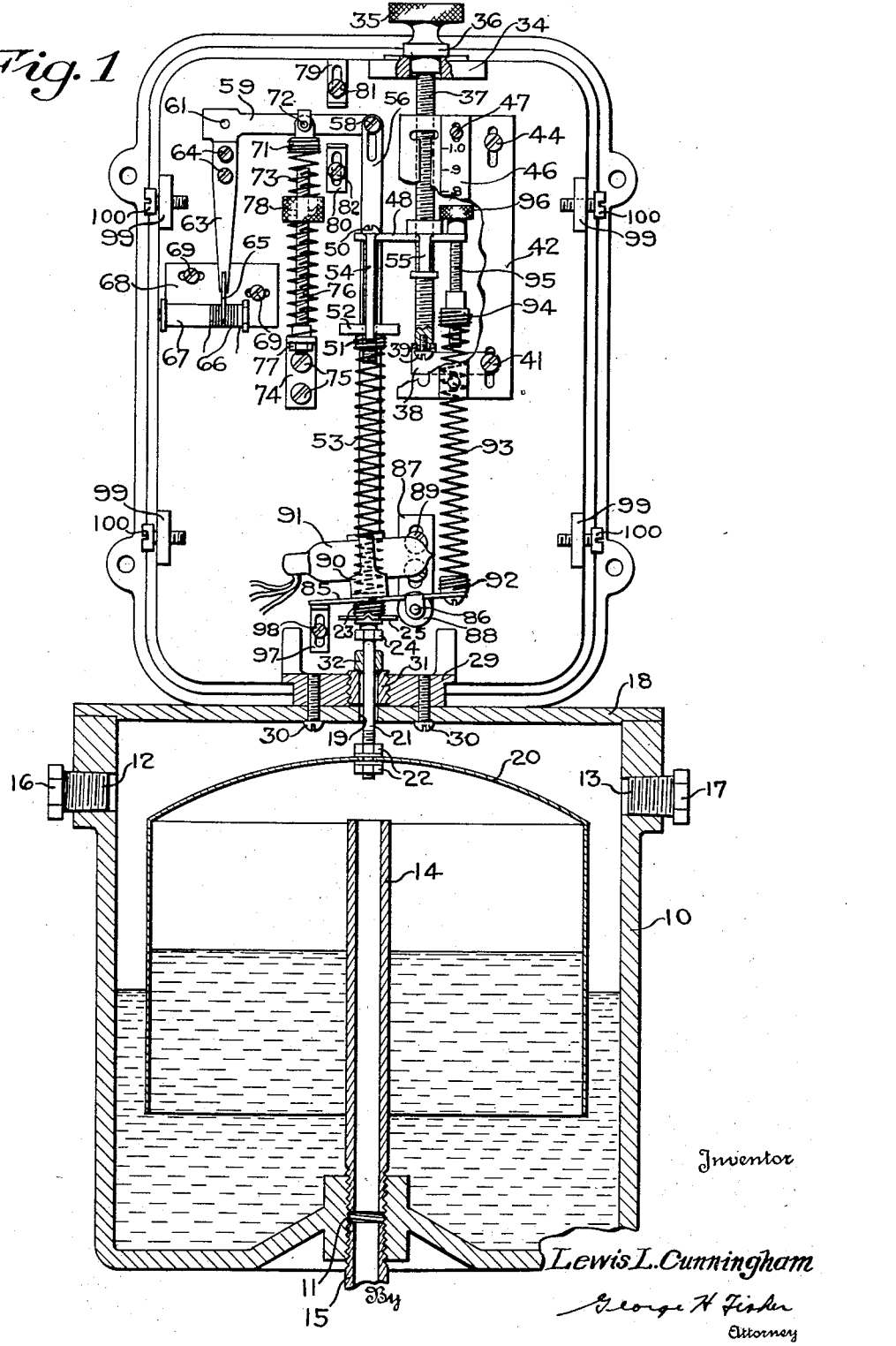
Fig. 1 is an elevational view partly in section of the pressure controller of my invention.
Figure 2:
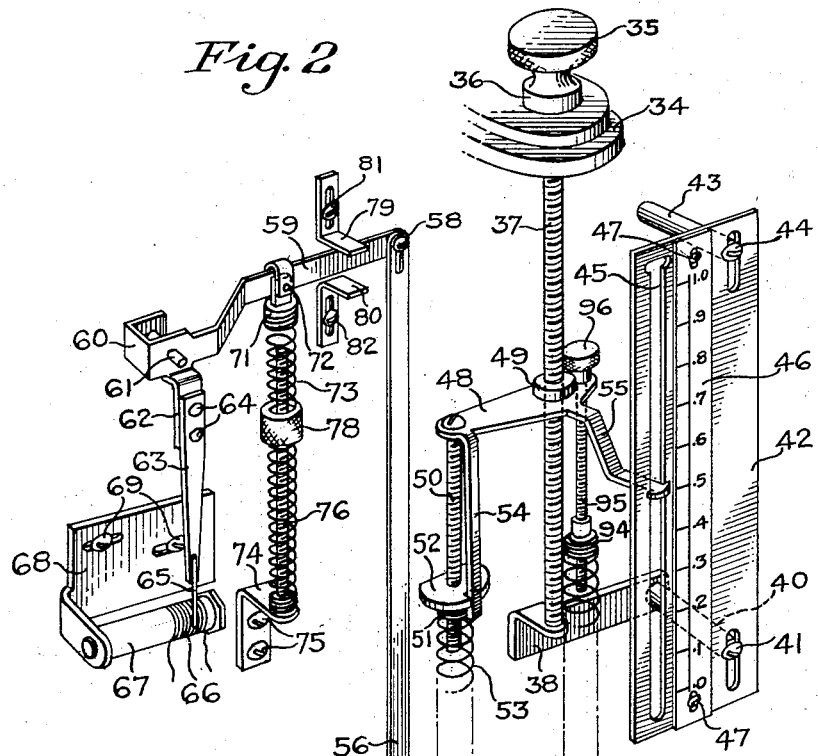
Fig. 2 is a perspective view of the parts shown in the upper portion of Fig. 1.
Figure 3:
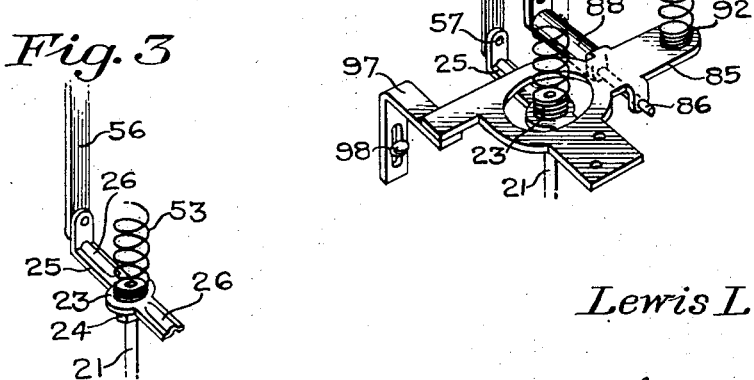
Fig. 3 is a perspective view of a detail of the mechanism shown in the lower portion of Fig. 2.

Referring now to Fig. 1, the pressure controller of my invention is shown to comprise a container or housing 10 partially filled with a liquid, such as water. The lower wall of the container or housing 10 is provided with a screw-threaded opening 11 and the side walls thereof are provided with oppositely spaced screw-threaded openings 12 and 13. The lower screw-threaded opening 11 receives a tube 14 which extends upwardly into the container above the level of the liquid contained therein. The screw-threaded opening 11 also accommodates a pipe or like conduit 15 which may lead to some source of sub-atmospheric pressure, not shown. The screw-threaded openings 12 and 13 are shown to be closed by plugs 16 and 17 respectively but, however, either of the plugs 16 or 17 may be removed and a pipe or conduit leading from some source of pressure either positive or negative may be substituted therefor. The container 10 is closed by means of a cover plate 18, having a circular opening 19 therein.

Located within the housing 10 is an inverted bell 20 which extends downwardly into the liquid to divide the container 10 into two chambers, one chamber being located within the bell 20 and the other chamber being located without the bell 20. A stud or rod 21 extending into the container 10 through the opening 19 is secured to the bell 20 by nuts 22. The outward end of the stud 21 is secured to a grooved nut 23 and held in place with respect thereto by means of a lock nut 24. Suitably secured to the grooved nut 23 by means of soldering or sweating is an arm or abutment 25, having crimped up portions 26 to form a knife-edge on the upper surface thereof. A base 28 is suitably secured to the cover plate 18 of the container 10 by an integral bracket 29 and screws 30. The bracket 29 has a screw-threaded opening adapted to receive a screw-threaded sleeve 31, having an internal bore of substantially the same diameter as the opening 19 in the cover plate 18. It is noted here that the openings or bores in the sleeve 31 and the cover plate 18 are relatively large with respect to the diameter of the rod or stud 21 so that no friction or binding occurs between the rod or stud 21 and the bracket 29 or the cover plate 18. In this manner, free and easy movement of the bell 20 is permitted. Loosely mounted on the stud 21 is a collar or sealing washer 32, having a beveled or curved portion that is adapted to seat against the opening in the sleeve 31. There is a very little clearance between the washer 32 and the stud 21 so that the passage of air between these two elements is negligible. The weight of the washer 32 is sufficient to maintain the washer 32 at all times against the screw-threaded sleeve 31 to effectively seal the opening between the stud 21 and the screw-threaded sleeve 31. This sealing method forms a salient feature of this invention.

Located on the upper end of the base 28 is an integral lug 34, having an opening adapted to receive an adjusting knob 35. The adjusting knob 35 is provided with a shoulder 36 which engages the lug 34 to prevent downward movement of the knob 35 with respect to the lug 34. The knob 35 carries a screw 37 which is rotatably supported at its lower end by a bracket 38 which is in turn secured to the base 28 by means of a spacer 40 and a screw 41. Upward movement of the screw 37 with respect to the bracket 38 and the lug 34 is prevented by means of the screw 39 secured to the end of screw 37. The lower end of a plate 42 is clamped between the screw 41 and the spacer 40 and in a like manner, the upper end of the plate 42 is clamped between a spacer 43 and a screw 44, the screw 44 being secured to the base 28. The plate 42 is made adjustable by the elongated slots traversed by the screws 41 and 44. The plate also contains a longitudinal slot 45 and located adjacent this slot 45 is a scale plate 46 which is adjustably mounted on the plate 42 by means of screws 47. A plate 48, having a screw-threaded boss 49 is screw-threaded to the screw 37 so that upon rotation of the screw 37, the plate 48 is moved upwardly or downwardly, rotation of the plate 48 being prevented by the pointer 55 extending through the slot 45. The plate 48 is provided with an opening through which is passed a screw 50 which is in screw-threaded engagement with a grooved nut 51. The nut 51 is provided with a notched flange 52 and the plate 48 is provided with a downwardly extending arm 54 to engage in the notch of the flange 52 to prevent rotation of the nut 51 with respect to the plate 48 upon rotation of the screw 50. One end of a tension spring 53 is connected to the grooved nut 51 and the other end of the tension spring 53 is connected to the grooved nut 23. The spring performs the function of suspending the bell 20 within the container 10 and by adjusting the tension in the spring 53, the pressure in the chamber 10 required to move the bell 20 is varied. The pointer 55, which extends through the longitudinal opening 45 in the plate 42, cooperates with the scale plate 48 to indicate the pressure required to move the bell 20 and indirectly the amount of tension within the spring 53. The screw 50 provides a means for factory calibration of the spring 53, and the screw 37 provides means for adjusting the instrument after it is installed.

One end of a link 56 is connected as by means of a screw 57 to the abutment or arm 25. The other end of the link 56 is connected by means of a screw 58 to one arm of a bell crank lever 59. The mid portion of bell crank lever 59 is bent over in the form of a U as at 60 to provide an adequate bearing for the bell crank lever 59 upon a pivoted pin 61 suitably secured to the base 28. A spring arm 63 is suitably secured to and insulated from the other arm 62 of the bell crank lever 59 by means of screws 64. The spring arm 63 carries a slider 65 which is adapted to slide across a resistance coil 66 wound upon a spool 67. The spool 67 is suitably secured to a bracket 68 which is adjustably mounted on the base 28 by means of screws 69. The slider 65 and the resistance coil 66 may perform a control function in a manner which is well known in the art.

Suitably secured to one arm of the bell crank lever 59 as by means of a pivot pin 72 is a grooved abutment collar 71. Secured to this grooved abutment collar 71 is a tension spring 73. A bracket 74 is secured to the base 28 by means of screws 75 and secured to the bracket 74 by means of a nut 77 is a screw 76 which extends upwardly within the spring 73 in a coaxial manner. The pitch of the screw 76 is the same as the pitch of the spring 73 and mounted on the screw 76 and cooperating with the spring 73 is a range adjusting nut 78. Suitable stops 79 and 80 are adjustably secured to the base on either side of the bell crank lever 59 by means of screws 81 and 82.

The details of the range adjusting spring assembly including the spring 73, the screw 76, and the range adjusting nut 78 are described in detail in my copending application S. N. 752,481, filed November 10, 1934, now Patent Number 2,041,050. It is sufficient to state therefore in this application that movement of the range adjusting nut 78 upwardly and downwardly does not vary the tension within the spring 73 but only varies the effective length of the same. It is preferable in this form of invention to so adjust the range adjusting spring assembly that when the bell crank lever 59 is midway between the two stops 79 and 80, zero tension is present within the spring 73 so that when the bell crank lever 59 is moved in either direction from this mid position an added resistance is placed thereon to retard movement in either direction thereby controlling the pressure differential required to move the slider a given distance on either side of the mid position.

With the parts in the position shown in Fig. 1, a decrease in pressure underneath the bell 20 and/or an increase in pressure above the bell 20 causes downward movement of stud 21 and consequent clockwise rotation of the bell crank lever 59 about its pivot 61. The pressure required to move the bell 20 downwardly is adjusted by varying the tension in the spring 53 by rotation of the knob 35. Downward movement of the bell 20 in this manner starts lefthand movement of slider 65 with respect to the coil 66 and this lefthand movement is then impeded by the effort of the spring 73 being placed in compression. When the adjusting nut 78 is in a lowered position so that the effective length of the spring 73 is greater than in the position shown in the drawings, less retarding effort is afforded by the spring 73 and consequently a lesser differential of pressure or range of pressure is required to move the slider 65 from its mid position as shown to its extreme left-hand position. Movement of the slider 65 from its mid position to its right hand position is accomplished in exactly the same manner as pointed out above except that this movement is caused by the changing of pressures within the container 10 in an opposite direction. Here again, the range adjusting spring 73 impedes the right hand movement of slider 65 by being placed in tension and when the effective length of spring 73 is greater than that shown in the drawings, the amount of retarding effort of spring 73 is decreased.

From the above, it is seen that I have provided a current controlling mechanism which may take the form of a resistance coil and a slider which is operated by a pressure responsive device such as an inverted bell with adjusting means whereby the pressure required to operate the current controlling means may be varied and wherein the range or differential of pressures required to operate the current controlling mechanism a given amount may be varied.

Located adjacent the arm or abutment 25 is a lever 85 pivoted on a pin 86 which is secured to the bracket 87 adjustably mounted on the base 28 by means of screws 89. The lever 85 is spaced with respect to the base 28 by means of a spacer 88 mounted on the pivot pin 86. The lever 85 carries a mercury switch clip 90 in which is mounted a mercury switch 91 of usual design. One end of the lever 85 is provided with an anchor 92 to which is secured one end of a spring 93. The other end of the spring 93 is secured to a grooved nut 94 which is screw-threaded on a screw 95 having a knurled head 96. The screw 95 extends through an opening in the plate 48 and the head 96 thereof abuts against the plate 48. The spring 93 therefore urges the lever 85 in a counter-clockwise direction and this counter-clockwise movement of the lever 85 is limited by a stop 97 adjustably mounted on the base 28 by means of a screw 98. The mercury switch 91 may be secured in the clip 90 in any suitable manner so that with the switch in the position shown in the drawings, it may be in either circuit making or circuit breaking position depending upon the function which it is desired that the switch shall perform.

Upward movement of the bell 20 in the manner described above will cause the knife-edge 26 of the arm or abutment 25 to engage the lever 85 to move the same away from its stop 97 in a clockwise direction against the tension of spring 93. Such clockwise movement of the lever 85 causes either circuit making or circuit breaking operation of the mercury switch 91 depending upon the manner in which the mercury switch 91 is secured in the clip 90. It is noted at this point that a lost motion exists between the abutment or arm 25 and the pivoted lever 85 so that a substantial movement of the bell 20 is permitted before the lever 85 is engaged by the abutment 25. The amount of lost motion between these two elements may be adjusted by adjusting the stop 97 so that practically any sequence of operation may be obtained. The amount of tension in the spring 93 is adjusted by the knob 35 in exactly the same manner in which the tension in the spring 53 is adjusted. For calibration purposes, the springs 53 and 93 are made independently adjustable in the manner pointed out above.

The base 28 is provided with lugs 99 adapted to receive screws 100 for securing a cover, not shown, in place to enclose the movable parts of the mechanism.

From the above it is seen that I have provided a pressure controller of novel construction, having means for adjusting the pressure at which said controller shall operate and the range or differential of pressures required to operate the controller, a second current controlling mechanism operated by the controller when the controller has been moved to a given position, and a sealing means which forms an effective seal without causing any undue friction to take place.

Although I have disclosed one form of my invention, various modifications thereof may become apparent to those skilled in the art and consequently this invention is to be limited only by the scope of the appended claims in the prior art.

I claim as my invention:

1. In a device of the class described, an enclosed housing, an inverted bell in said housing, a rod carrying said bell and extending through said housing, sealing means for said rod, means for varying the pressure within said housing for moving said bell, a support mounted on said housing exteriorly thereof, a resistance carried by said support, a lever pivoted on said support and having a slider engaging said resistance, a link connecting said rod and said lever to move said slider with respect to said resistance upon movement of said bell, a spring connected at one end to said rod for urging said bell in one direction, adjusting means for said spring including a member secured to the other end of said spring and an adjusting screw for moving said member to vary the tension in said spring whereby the pressure required to move said slider may be varied, a range adjusting spring assembly including a spring secured to said lever, a screw secured to said support and a nut engaging said spring and said screw for varying the effective length of said spring whereby the range of pressures required to move the slider a given distance with respect to said resistance may be varied, a lever pivoted to said support adjacent said rod, an adjustable spring urging said lever in one direction, a stop for limiting movement of said lever, a switching mechanism carried by said lever, and an abutment carried by said rod to engage said lever to operate said switching mechanism.

2. In a device of the class described, an enclosed housing, an inverted bell in said housing, a rod carrying said bell and extending through said housing, sealing means for said rod, means for varying the pressure within said housing for moving said bell, a support mounted on said housing exteriorly thereof, a resistance carried by said support, a lever pivoted on said support and having a slider engaging said resistance, a link connecting said rod and said lever to move said slider with respect to said resistance upon movement of said bell, a spring connected at one end to said rod for urging said bell in one direction, adjusting means for said spring including a member secured to the other end of said spring and an adjusting screw for moving said member to vary the tension in said spring whereby the pressure required to move said slider may be varied, a lever pivoted to said support adjacent said rod, an adjustable spring urging said lever in one direction, a stop for limiting movement of said lever, a switching mechanism carried by said lever, and an abutment carried by said rod to engage said lever to operate said switching mechanism.

3. In a device of the class described, an enclosed housing, an inverted bell in said housing, a rod carrying said bell and extending through said housing, means for varying the pressure within said housing for moving said bell, a support mounted on said housing exteriorly thereof, a resistance carried by said support, a lever pivoted on said support and having a slider engaging said resistance, a link connecting said rod and said lever to move said slider with respect to said resistance upon movement of said bell, a spring connected at one end to said rod for urging said bell in one direction, adjusting means for said spring including a member secured to the other end of said spring and an adjusting screw for moving said member to vary the tension in said spring whereby the pressure required to move said slider may be varied, a range adjusting spring assembly including a spring secured to said lever, a screw secured to said support and a nut engaging said spring and said screw for varying the effective length of said spring whereby the range of pressures required to move the slider a given distance with respect to said resistance may be varied, a lever pivoted to said support adjacent said rod, an adjustable spring urging said lever in one direction, a stop for limiting movement of said lever, a switching mechanism carried by said lever, and an abutment carried by said rod to engage said lever to operate said switching mechanism.

4. In a device of the class described, an enclosed housing, an inverted bell in said housing, a rod carrying said bell and extending through said housing, means for varying the pressure within said housing for moving said bell, a support mounted on said housing exteriorly thereof, a resistance carried by said support, a lever pivoted on said support and having a slider engaging said resistance, a link connecting said rod and said lever to move said slider with respect to said resistance upon movement of said bell, a spring connected at one end to said rod for urging said bell in one direction, adjusting means for said spring including a member secured to the other end of said spring and an adjusting screw for moving said member to vary the tension in said spring whereby the pressure required to move said slider may be varied, a lever pivoted to said support adjacent said rod, an adjustable spring urging said lever in one direction, a stop for limiting movement of said lever, a switching mechanism carried by said lever, and an abutment carried by said rod to engage said lever to operate said switching mechanism.

5. In a device of the class described, a chamber, an inverted bell in said chamber movable in response to changes of pressure in said chamber, spring means for supporting said bell in said chamber, current controlling means operatively associated with said bell to be operated by movement of said bell, means for adjusting said spring means to vary the pressure required to operate said current controlling means, and a second current controlling means operatively associated with said bell to be operated thereby upon movement of said bell to a given position.

6. In a device of the class described, a pressure responsive device, spring means urging said device in one direction, a pivoted lever, an abutment, spring means urging said lever against said abutment, control mechanism operated by said lever, and means operated by said pressure responsive device to move said lever away from said abutment and a single adjusting means for both spring means.

7. In a device of the class described, a pivoted lever, a switch operated by said lever, a spring for urging said lever against an abutment, a pressure responsive device for rotating said lever against the action of said spring, a main adjusting spring for said pressure responsive device, and a single means for simultaneously adjusting both springs, a resistance element, a slider engaging said resistance, and means operated by said pressure responsive device independently of said lever for moving said slider across the resistance.

LEWIS L. CUNNINGHAM.